United States Patent [19]
Jessee

[11] 4,187,494
[45] Feb. 5, 1980

[54] VEHICLE GUIDANCE DEVICE

[76] Inventor: John W. Jessee, 2481 Roland Rd., Sacramento, Calif. 95821

[21] Appl. No.: 848,713

[22] Filed: Nov. 4, 1977

[51] Int. Cl.² ............................................. B60Q 1/00
[52] U.S. Cl. .................. 340/52 R; 280/477; 340/393; 340/686
[58] Field of Search ............. 340/52 R, 393, 539, 340/686, 687; 280/477

[56] References Cited

U.S. PATENT DOCUMENTS

| Re. 28,590 | 10/1975 | Salmi | 280/477 |
|---|---|---|---|
| 2,467,400 | 4/1949 | Murray | 340/539 |
| 3,337,992 | 8/1967 | Jolson | 343/225 |
| 3,588,858 | 6/1971 | Demuth | 340/686 |
| 3,605,088 | 9/1971 | Savelli | 340/70 |
| 3,731,274 | 5/1973 | Green | 340/52 R |
| 3,938,122 | 2/1976 | Mangus | 340/52 R |

Primary Examiner—Donald J. Yusko
Assistant Examiner—Joseph E. Nowicki
Attorney, Agent, or Firm—Clarence A. O'Brien; Harvey B. Jacobson

[57] ABSTRACT

A device to facilitate the positioning of a towing vehicles with respect to a towed vehicle whereby hitch components on the vehicles are properly positioned for articulately connecting the vehicles. The device includes a flexible tension member having one end connected with a spring wound reel on one of the vehicles and the other end connected with the other of the vehicles. A sensing device is associated with the tension member and the vehicles to indicate to the operator of the towing vehicle the manner in which the towing vehicle should be maneuvered to properly position the hitch components. The sensing means is actuated in response to angular and linear disposition of the flexible tension member which actuate a signal generating means which produces distinguishable audible and visual signals.

9 Claims, 12 Drawing Figures

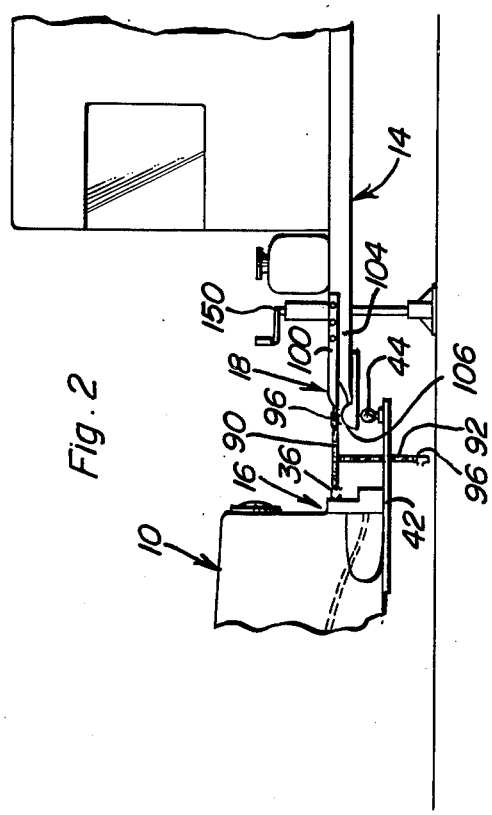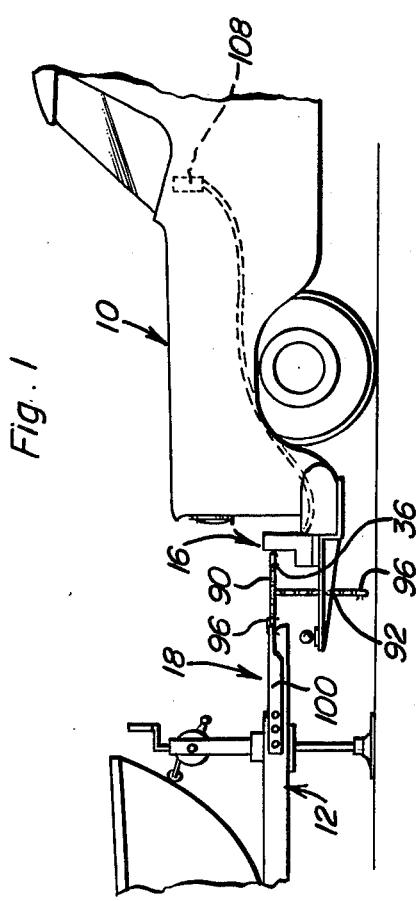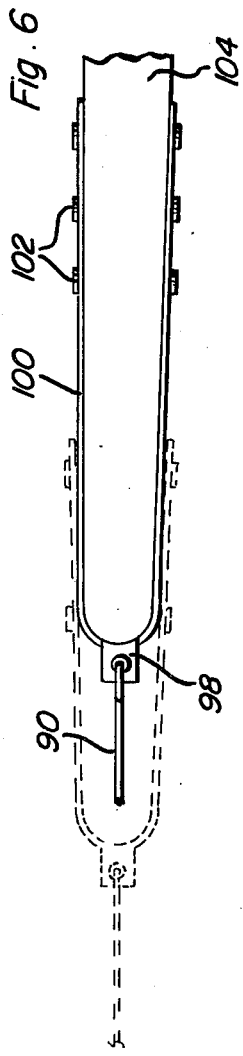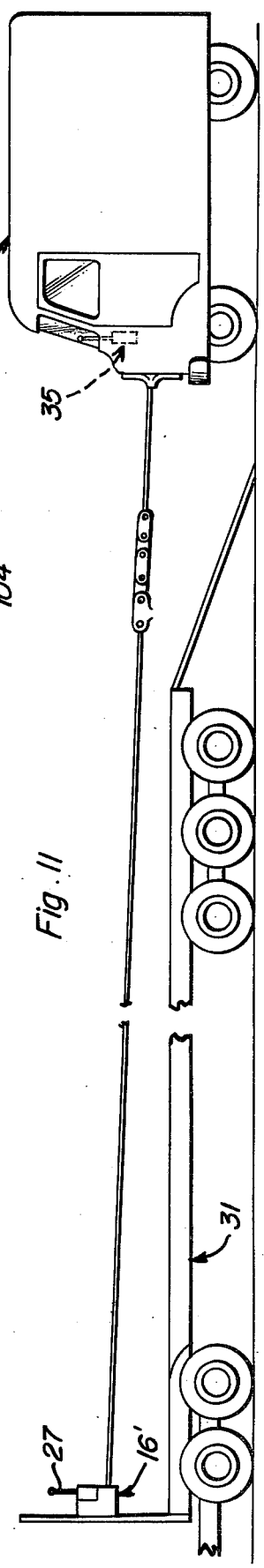

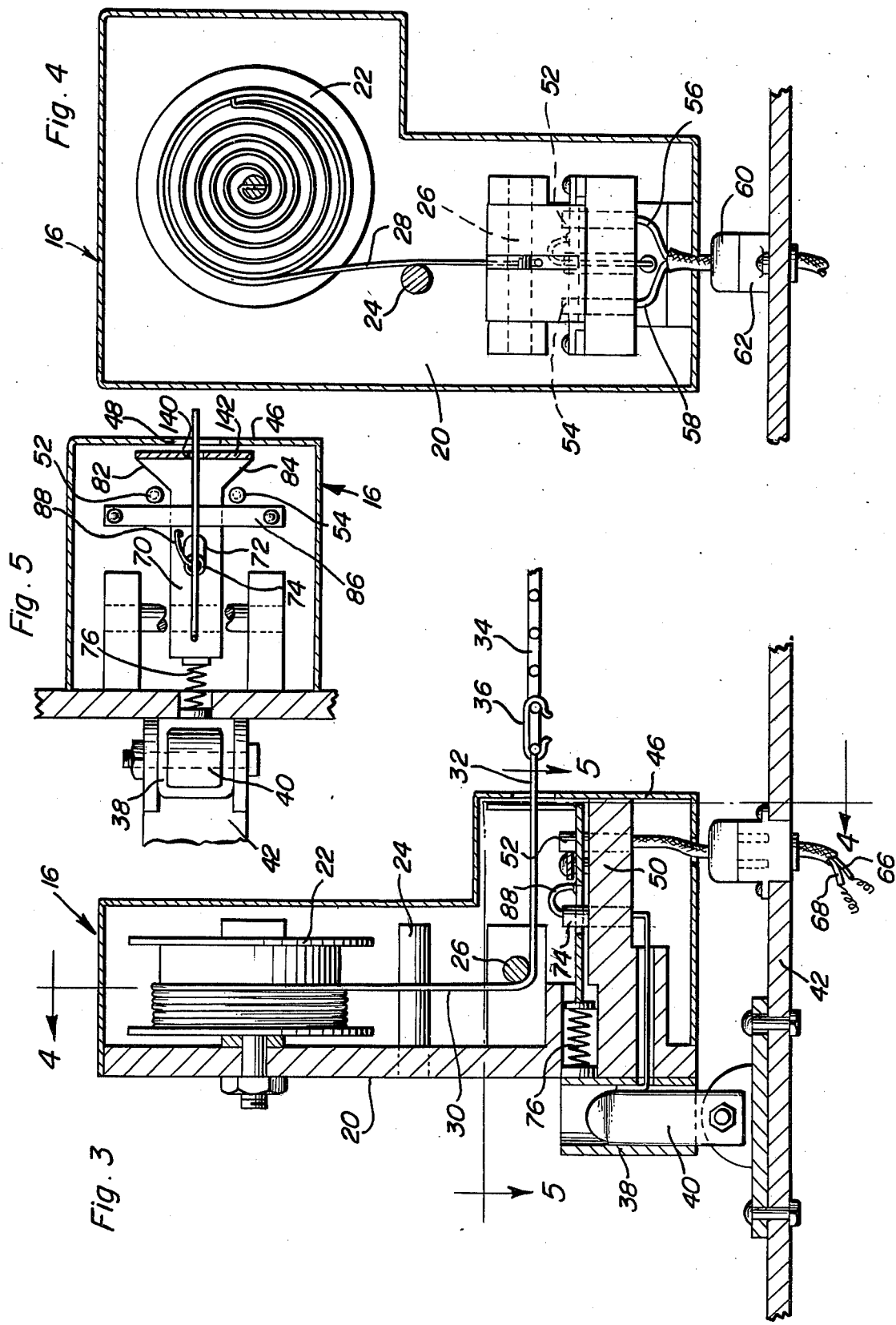

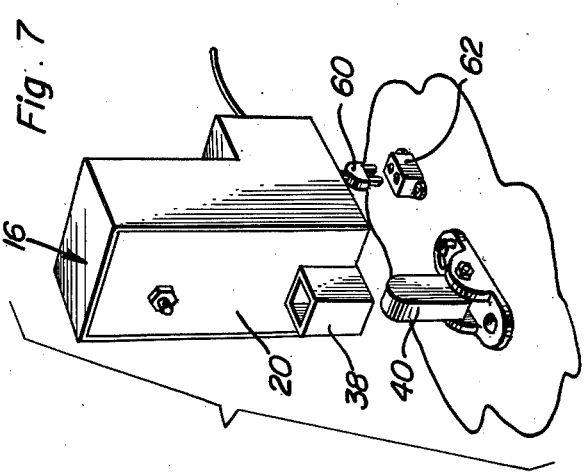
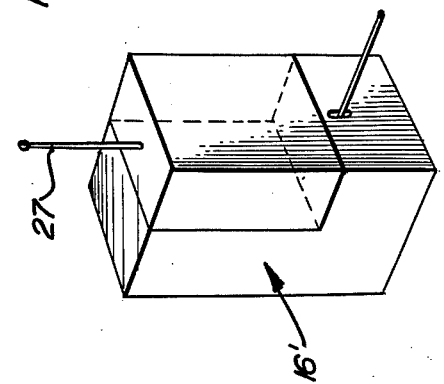
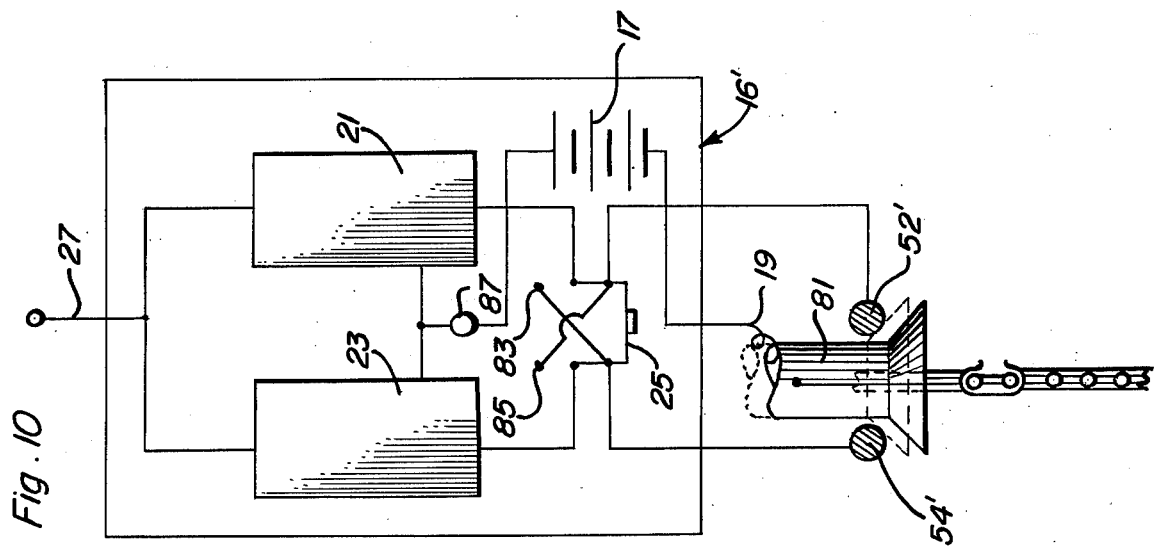

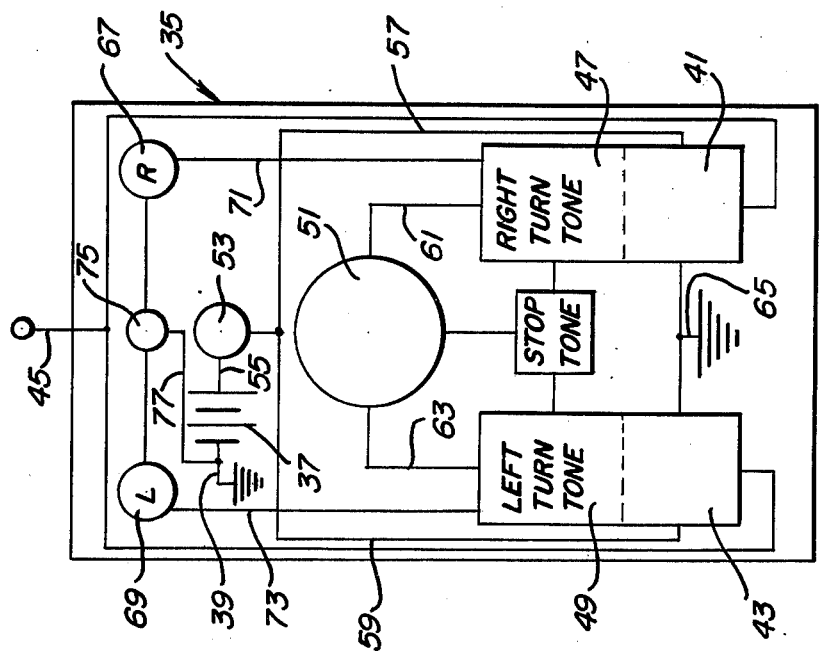
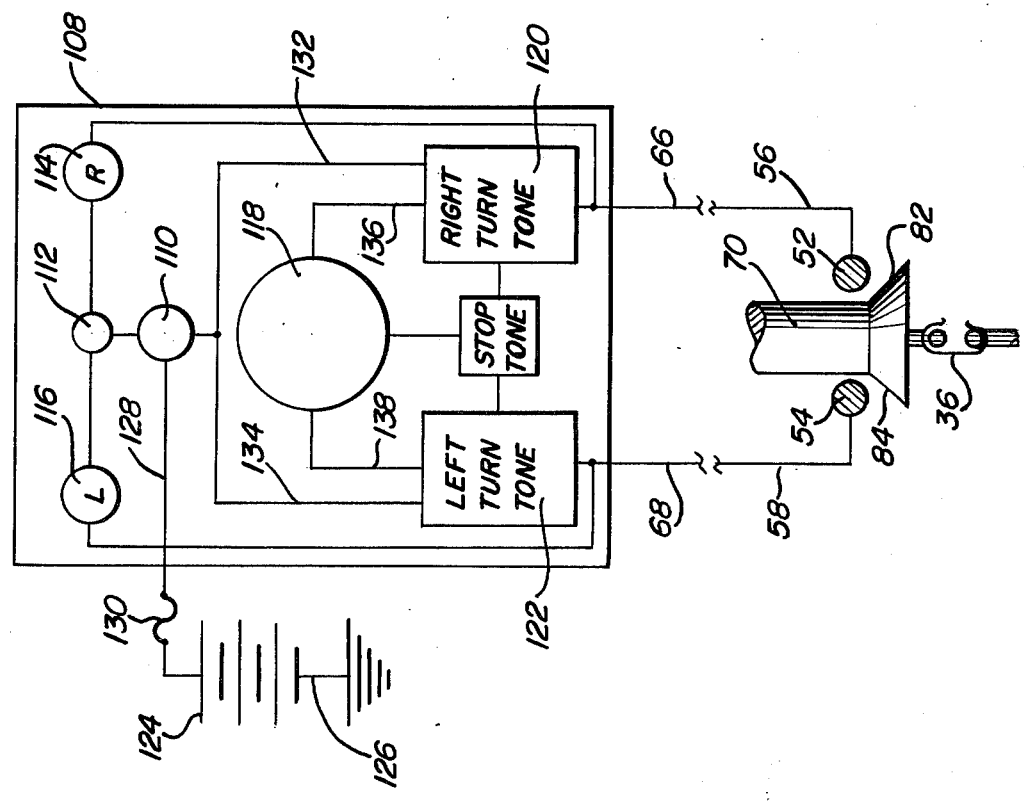

VEHICLE GUIDANCE DEVICE

BACKGROUND OF THE INVENTION

Moving a first vehicle into precise position relative to another vehicle is often difficult inasmuch as the operator of the moving vehicle is not in a position to view the close relationship of those parts of the two vehicles which determine the desired relative positions of the vehicle. In instances wherein one vehicle must be moved to a precise position relative to another vehicle, an observer is often utilized to assist the driver of the movable vehicle with hand and voice signals. However, an observer is not always available and even when a person is available to act as an observer he or she may not be skilled in the art of directing the operator of the movable vehicle into the precise desired position. Accordingly, a need exists for a guidance device whereby the operator of a first vehicle may move the first vehicle into precise position relative to a second vehicle.

Various forms of guidance devices specifically designed for this purpose have been heretofore designed and are disclosed in U.S. Pat. Nos. 3,605,088, 3,731,274, 3,825,921, 3,938,122 and Re. 28,590.

BRIEF DESCRIPTION OF THE INVENTION

The guidance device of the instant invention comprises a first mount from which a winding drum is journaled having one end of an elongated flexible tension member attached thereto for winding thereon. The winding drum is spring biased to rotate in a direction for winding the tension member thereon and the first mount additionally includes tension member position sensing means whereby lateral shifting of the tension member at a point spaced from the winding drum to opposite sides of a predetermined path may be sensed and the sensing means is operatively associated with a pair of signal generating means for generating first and second signals to indicate lateral shifting of the tension member to opposite sides of the predetermined path. A second mount is provided for attachment to the other vehicle and the free end of the tension member and the second mount include coacting structure releasably anchoring the tension member to the second mount.

The main object of this invention is to provide a guidance device which may be utilized by the operator of a vehicle to assist him in moving his vehicle along a predetermined path toward a second vehicle and which will also be operative to indicate to the driver of the first vehicle when the first vehicle is in a predetermined position relative to the second vehicle.

Another object of this invention is to provide a guidance device which may be readily adapted for use in conjunction with various vehicles.

Another important object of this invention is to provide a guidance device which may be utilized by the driver of a vehicle desirous to move his vehicle along a predetermined path relative to another vehicle and who is approaching the aforementioned predetermined path at a significant angle relative thereto.

A final object of this invention to be specifically enumerated herein is to provide a guidance device which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of a pair of vehicles in a predetermined position relative to each other for coupling the vehicles together and with a first form of guidance device of the present invention operatively associated with the vehicles;

FIG. 2 is a fragmentary side elevational view of the rear end of the right-hand vehicle illustrated in FIG. 1 operatively associated with a third vehicle and in a desired predetermined position relative thereto;

FIG. 3 is an enlarged fragmentary longitudinal vertical sectional view taken substantially upon a plane passing through the first mount portion of the guidance device illustrated in FIG. 2;

FIG. 4 is a fragmentary transverse vertical sectional view taken substantially upon the plane indicated by the section line 4—4 of FIG. 3;

FIG. 5 is a fragmentary horizontal sectional view taken substantially upon the plane indicated by the section line 5—5 of FIG. 3;

FIG. 6 is a fragmentary top plan view illustrating the second mount portion of the instant invention as applied to the trailer tongue illustrated in FIG. 2 and on somewhat of an enlarged scale;

FIG. 7 is a perspective view of the mount assembly illustrated in FIG. 3;

FIG. 8 is a diagrammatic view of the wiring circuitry of the signal generating structure of that form of the invention illustrated in FIGS. 1 and 2;

FIG. 9 is a diagrammatic view of the wiring circuitry of a second form of signal generating structure utilizing radio transmitted and received signals;

FIG. 10 is a diagrammatic view illustrating the wiring circuitry for the radio signal generating component used in the second form of the invention;

FIG. 11 is a fragmentary side elevational view illustrating the manner in which the second radio signal transmitting and receiving form of the invention may be utilized in conjunction with a first vehicle to be moved along a predetermined path relative to a second vehicle; and FIG. 12 is a perspective view of the first mount to be used in the second form of the invention.

DETAILED DESCRIPTION OF THE INVENTION

Referring now more specifically to FIGS. 1-6 of the drawing, the reference numeral 10 generally designates a conventional form of motor vehicle to be moved forwardly along a predetermined path toward a second vehicle referred to in general by the reference numeral 12 (see FIG. 1). Also, the vehicle 10 may be moved rearwardly along a predetermined path toward a third vehicle referred to in general by the reference numeral 14 (see FIG. 2).

The guide device of the instant invention includes a pair of first mounts referred to in general by the reference numeral 16 mounted on the front and rear ends of the vehicle 10 and a pair of second mounts referred to in general by the reference numeral 18 mounted on the vehicles 12 and 14.

Although the mounts 16 may be mounted on both the front and rear ends of the vehicle 10, if it is desired, only one of the mounts 16 may be utilized.

For the purpose of describing the structure in operation of the first form of the invention illustrated in FIGS. 1 and 2, reference will be made only to the first mount 16 mounted on the rear of the vehicle 10 illustrated in FIG. 2 and operatively associated with the vehicle 14.

The mount 16 includes a housing 20 in which a spring biased winding reel 22 is journaled and the housing 20 includes a pair of guides 24 and 26 therein. One end portion 28 of an elongated flexible tension member 30 is attached to the reel 22 for winding thereon and the other end portion 32 of the tension member 30 is attached to the adjacent end of a chain 34 by means of a removable clip 36.

The housing 20 includes a vertical sleeve portion 38 removably telescoped downwardly over an upwardly projecting and pivotally mounted shank 40 supported from the rear tow bar 42 of the vehicle 10, the rear end of the tow bar 42 having a ball hitch element 44 mounted thereon. Accordingly, the housing 20 may be removed from engagement with the shank 40.

The housing 20 includes a wall 46 opposing the vehicle 14 and having a window opening 48 formed therein. In addition, the housing 20 supports a mounting bracket 50 inwardly of the wall 46 and from which a pair of insulated upstanding contacts 52 and 54 are mounted. The contacts 52 and 54 have conductors 56 and 58 electrically connected thereto and the conductors 56 and 58 are attached to a male plug 60 removably electrically coupled to a female plug 62 to which conductors 66 and 68 are electrically connected for electrical connection with the conductors 56 and 58.

A wobble plate 70 is mounted within the housing 20 and includes a longitudinal slot 72 therein in which an upstanding sleeve 74 is slidingly and rotatingly received. The wobble plate 70 is free to shift horizontally relative to the mounting bracket 50 and a compression spring 76 is connected between the mounting bracket 50 and the wobble plate 70 and thus yieldingly biases the wobble plate 70 toward a position with the sleeve 74 seated in the end of the slot 72 remote from the window opening 48. The end of the wobble plate 70 adjacent the wall 46 includes opposite side portions 82 and 84 disposed adjacent to but slightly outwardly of the contacts 52 and 54 from the spring 76 and which are engageable with the contacts 52 and 54 upon angular displacement of the wobble plate 70 about the sleeve 74 or rearwardly shifting of the wobble plate 70 inwardly from the wall 46. A guide bar 86 overlies that portion of the wobble plate 70 between the slot 72 and the contacts 52 and 54 and a ground wire 88 electrically grounds the wobble plate 70 to the shank 40 within the sleeve portion 38, the ground wire 88 passing downwardly through the sleeve 74.

The end of the chain 34 remote from the clip 36 has a pair of selectively usable end portions 90 and 92 supported therefrom and provided with clips 96. The selected clip 96 is removably engaged with an anchor tab 98 carried by the bight portion of a U-shaped strap 100 magnetically attached, by magnets 102, to the tongue 104 of the vehicle 14. The tongue 104 includes a socket element 106 positioned immediately over the ball element 44.

With attention invited now more specifically to FIG. 8 of the drawings, it may be seen that the interior of the vehicle 10 includes a housing 108 therein in which there is disposed a combined on-off switch and volume control 110, a push button switch 112, first and second indicator lights 114 and 116, a speaker 118, and electrically actuated tone generators 120 and 122. The tone generators 120 and 122 may generate different frequency tones, or may be voice simulating tone generators for simulating the commands "right" and "left".

The vehicle 10 includes a battery 124 grounded as at 126 and a conductor 128 including a fuse 130 which electrically connects the battery 124 to the switch 110. The switch 110 is electrically connected in parallel to the tone generators 120 and 122 through electrical conductors 132 and 134 and the tone generators 120 and 122 are electrically connected to the speaker 118 through conductors 126 and 138, the speaker 118 being suitably grounded.

In operation, when the vehicles 10 and 14 are considerably spaced apart with the tension member 30 extending therebetween and the vehicle 10 is moved rearwardly toward vehicle 14 for the purpose of removably coupling together the elements 44 and 106, should the vehicle 10 become out of alignment with the vehicle 14 such that the tension member 30 moves laterally out of the predetermined path of movement of the vehicle 10 toward the vehicle 14, the tension member 30 will engage one side of the slot 140 formed in the upstanding flange 142 of the wobble plate 70 and cause the wobble plate 70 to swing to a position in engagement with one of the contacts 52 and 54. This, will of course, cause that contact to be grounded through the wobble plate 70 and will actuate the corresponding tone generator. If the driver of the vehicle is inexperienced with the guidance device, he may push the actuator of the push button switch 112 whereupon the corresponding signal light 114 or 116 will be electrically actuated indicating to the operator of the vehicle 10 the direction in which he must move the vehicle 10 in order to again proceed along the predetermined path toward the vehicle 14.

After the operator of the vehicle 10 has heard the tone emitted from the actuated tone generator through the speaker 118, he will then immediately recognize the difference between that tone and the tone generated by the other tone generator and will thus be able to move the vehicle 10 rearwardly toward the vehicle 14 along the predetermined path. When the vehicle 10 has proceeded sufficiently rearwardly to position the element 44 immediately beneath the element 106, the clip 36 will have passed through the opening 48 and will have engaged the flange 142 and urged the wobble plate 70 rearwardly relative to the sleeve 74 and will thus cause the portions 82 and 84 of the wobble plate 70 to engage both the contacts 52 and 54 whereupon both tone generators 120 and 122 will be actuated. The resultant combined two tones reproduced by the speaker 118 will, of course, be readily discernible by the operator of the vehicle 10 and he may immediately stop rearward movement of the vehicle 10 with the element 44 positioned immediately beneath the element 106. Thereafter, the operator of the vehicle 10 may dismount from his vehicle and lower tongue 104 of the vehicle 14 by means of the jack 150 on the tongue 104 and thereafter latch the socket element 106 in full engagement with the ball element 44. Of course, the first and second mounts 16 and 18 and the chain 34 may then be removed and the on-off switch 110 may be turned to the off position thereof.

With attention now invited more specifically to FIGS. 9–12 of the drawings, a second form of the first mount is referred to in general by the reference numeral 16'. The mount 16' is mechanically operationally similar to the mount 16, but includes its own battery source 17 of electrical potential grounded as at 19. The mount 16' includes insulated contacts 52' and 54' corresponding to the contacts 52 and 54 and are connected to a pair of different signal frequency radio transmitters 21 and 23 through a double pole, double throw switch 25. The radio transmitters 21 and 23 are connected to a single antenna 27 and the transmitters 21 and 23 are actuated in substantially the same manner in which the signal generators 120 and 122 are actuated and the first mount 16' is mounted on a vehicle referred to in general by the reference numeral 31, see FIG. 11. A second vehicle referred to in general by the reference numeral 33 is provided and has mounted therein a housing 35 including a battery source 37 of electrical potential grounded as at 39 and the housing 35 further includes a pair of radio signal receivers 41 and 43 connected to a single antenna 45 and the receivers 41 and 43 are electrically connected to tone generators 47 and 49 corresponding to the generators 120 and 122 and electrically connected to a speaker 51 corresponding to the speaker 118. The source 37 is electrically connected to a switch 53 corresponding to the switch 110 by means of a conductor 55 and the switch 53 is electrically connected to the radio signal receivers 41 and 43 by means of conductors 57 and 59 and the tone generators 47 and 49 are electrically connected to the speaker 51 by means of conductors 61 and 63. Further, the receivers 41 and 43 are grounded as at 65. It will also be noted that a pair of indicator lights 67 and 79 corresponding to the lights 114 and 116 are provided and serially connected in conductors 71 and 73 electrically connecting the push button switch 75 corresponding to the switch 112 to the tone generators 47 and 49, the switch 75 being grounded as at 77.

It may therefore be seen that the guidance device illustrated in FIG. 11 is operative in substantially the same manner as the guidance device illustrated in FIGS. 1 and 2 except that the transmitters 21 and 23 are actuated in response to lateral shifting of the wobble plate 81 corresponding to the wobble plate 70 and that the signals generated by the transmitters 21 and 23 are received by the receivers 41 and 43 for actuating the tone generators 47 and 49. Of course, the push button switch 75 is utilized in substantially the same manner as the push button switch 112.

Further, and with attention again invited to FIG. 1, 2 and 10, the vehicle 10 may be provided with shanks 40 on both the front and rear ends thereof and a first mount 16' in lieu of the first mount 16 and the vehicle 10 may further be provided with the housing 35 in lieu of the housing 108. In such an instance, only one pair of radio transmitters 21 and 23 need be utilized and the double pole, double throw switch 25 may have the second set of contacts corresponding to the contacts 52' and 54' electrically connected to the contacts 83 and 85 of the switch 25. Thus, when the vehicle 10 is being backed toward the vehicle 14, the double pole, double throw switch 25 would be in the position thereof illustrated in FIG. 10. However, when the vehicle 10 was being advanced toward the vehicle 12, the double pole, double throw switch 25 would be connected to the contacts 83 and 85. The switch 25 may include a center open "off" position, or the first mount 16' may include an "on-off" switch 87 in the conductor electrically connecting the tone generators 21 and 23 to the battery 17.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A guidance device to aid an operator in positioning a hitch element on a towing vehicle in desired relationship to a hitch element on a towed vehicle comprising a flexible tension member connectible between the vehicles, means mounted on one of said vehicles to maintain tension in said tension member as the towing vehicle is maneuvered in relation to the towed vehicle, sensing means mounted on one of said vehicles and engageable by the flexible tension member to sense the angular relation of the flexible tension member to said one vehicle and the linear position of the flexible tension member in relation to said one vehicle, an indicator means actuated in response to the sensing means to provide signals to the operator of the towing vehicle to enable the operator to maneuver the towing vehicle properly as it approaches the towed vehicle and to stop the towing vehicle when the towing vehicle is positioned with the hitch element thereon accurately positioned in desired relationship both laterally and longitudinally with respect to the hitch element on the towed vehicle, said indicator means signals providing distinguishable audible signals to the towing vehicle operator representing said angular relation and linear position of said flexible tension member without requiring the operator to visually observe the indicator means.

2. The structure as defined in claim 1 wherein said indicator means includes left and right directional signal generating means for generating distinguishable left and right audible signals to direct the operator of a towing vehicle, said sensing means simultaneously actuating both of said signal generating means to provide an audible signal combining the right and left audible signals to indicate to the operator that the hitch element on the towing vehicle is properly positioned in desired relationship both laterally and linearly with respect to the hitch element on the towed vehicle.

3. The structure as defined in claim 2 wherein said indicator means further includes radio signal transmitting means operative to generate and transmit radio signals of different frequencies in response to said sensing means sensing the angular relation of said tension member on opposite sides of a center position and transmitting both frequency radio signals when the sensing means senses a predetermined linear position of the tension member and radio signal receiver means for receiving said transmitted signals of different frequencies, said left and right directional signal generating means being operatively associated with said radio signal receiver means for generating left and right directional signals in response to said radio signal receiver means receiving said different frequencies and generating a combination of the left and right directional signals when receiving both of said frequencies.

4. The structure as defined in claim 3 wherein said signal generating means produce left and right directional signals comprising different tone audible signals as the left and right signals with the combination left and right signals being a combination of the different tone audible signals.

5. The structure as defined in claim 4 wherein said indicator means also includes a left and right signal light visually observable by the operator of the towing vehicle and being energized in response to said sensing means sensing the angular relation of said tension member on opposite sides of a center position with both of the signal light being energized when the sensing means senses a predetermined linear position of the tension member thereby indicating to the operator that the hitch element on the towing vehicle is in desired relationship to the hitch element on the towed vehicle.

6. The structure as defined in claim 2 wherein said sensing means include a plate pivotally and slidably supported on one of said vehicles for pivotal movement about a vertical axis and longitudinal sliding movement, spring means engaged with the plate for biasing the plate longitudinally toward the other vehicle, said plate including an upstanding slotted flange thereon is spaced relation to the pivot axis with the tension member including a longitudinally extending portion between the tension means and the other vehicle received in the slotted flange whereby angular movement of the tension member to opposite sides of a center position will pivot the plate about a vertical axis, first and second switch means operatively associated with said plate to close and electrical circuit when the plate is pivoted beyond a predetermined angular position from a center position, said tension member having abutment means thereon engaging the side edges of the slotted flange to move the plate longitudinally to actuate both of the switch means simultaneously when the tension means moves the tension member to a predetermined linear position.

7. The structure as defined in claim 6 wherein said tension means is a spring wound reel having the tension member wound thereon, a housing supporting said reel, plate and switch means, and means detachably mounting the housing to one of said vehicles to enable attachment and removal of the sensing means to enable the guidance device to be used with different vehicles.

8. The structure as defined in claim 7 wherein said tension member includes magnetic means releasably securing the end thereof remote from the reel to the other vehicle to automatically release the tension member in the event a person walks between the towing and towed vehicles when using the guiding device thereby eliminating the possibility of the person tripping over the tension member stretched taut between the vehicles.

9. The structure as defined in claim 11 wherein said indicator means includes left and right directional signal generating means for generating distinguishable left and right audible signals to direct the operator of a towing vehicle, said sensing means simultaneously actuating both of said signal generating means to provide an audible signal combining the right and left audible signals to indicate to the operator that the hitch element on the towing vehicle is properly positioned in desired relationship both laterally and linearly with respect to the hitch element on the towed vehicle, said signal generating means including radio signal transmitting means operative to generate and transmit radio signals of different frequencies in response to said sensing means sensing the angular relation of said tension member on opposite sides of a center position and transmitting both frequency radio signals when the sensing means senses a predetermined linear position of the tension member and radio signal receiver means for receiving said transmitted signals of different frequencies, said left and right directional signal generating means being operatively associated with said radio signal receiver means for generating left and right directional signals in response to said radio signal receiver means receiving said different frequencies and generating a combination of the left and right directional signals when receiving both of said frequencies, said signal generating means producing left and right directional signals comprising different tone audible signals as the left and right signals with the combination left and right signals being a combination of the different tone audible signals, said indicator means also including a left and right signal light visually observable by the operator of the towing vehicle and being energized in response to said sensing means sensing the angular relation of said tension member on opposite sides of a center position with both of the signal lights being energized when the sensing means senses a predetermined linear position of the tension member thereby indicating to the operator that the hitch element on the towing vehicle is in the desired relationship to the hitch element on the towed vehicle.

* * * * *